United States Patent [19]
Moroto et al.

[11] Patent Number: 5,832,396
[45] Date of Patent: Nov. 3, 1998

[54] HYBRID VEHICLE INCLUDING MEANS FOR MAINTAINING RESIDUAL CHARGE CAPACITY BASED ON DESTINATION INFORMATION

[75] Inventors: Shuzo Moroto; Hideki Hisada, both of Aichi-ken, Japan

[73] Assignee: Kabushikikaisha Equos Research, Japan

[21] Appl. No.: 911,273

[22] Filed: Aug. 14, 1997

Related U.S. Application Data

[62] Division of Ser. No. 546,956, Oct. 23, 1995.

[30] Foreign Application Priority Data

Oct. 25, 1994 [JP] Japan ................................. 6-285834

[51] Int. Cl.$^6$ .............................. B60K 6/04; G01C 21/00
[52] U.S. Cl. ........................... 701/22; 701/209; 180/65.2; 180/65.8
[58] Field of Search .............................. 701/22, 29, 207, 701/213, 123, 201, 209; 340/439, 455; 180/65.2, 65.3, 65.4, 65.8

[56] References Cited

U.S. PATENT DOCUMENTS

| | | | |
|---|---|---|---|
| 4,306,156 | 12/1981 | Monaco et al. .......................... | 290/17 |
| 4,351,405 | 9/1982 | Fields et al. ............................. | 180/65 |
| 5,176,213 | 1/1993 | Kawai et al. ........................... | 180/243 |
| 5,359,228 | 10/1994 | Yoshida .................................. | 290/17 |
| 5,367,455 | 11/1994 | Kitagawa et al. ................. | 364/424.01 |
| 5,441,122 | 8/1995 | Yoshida ................................ | 180/65.2 |
| 5,487,002 | 1/1996 | Diller et al. ...................... | 364/424.01 |
| 5,492,190 | 2/1996 | Yoshida ................................ | 180/65.4 |
| 5,566,774 | 10/1996 | Yoshida ................................ | 180/65.4 |
| 5,627,752 | 5/1997 | Buck et al. ....................... | 364/424.04 |

FOREIGN PATENT DOCUMENTS

| | | |
|---|---|---|
| 56-132102 | 10/1981 | Japan . |
| 63-232027 | 9/1988 | Japan . |

*Primary Examiner*—Michael Zanelli
*Attorney, Agent, or Firm*—Lorusso & Loud

[57] ABSTRACT

A hybrid vehicle capable of efficiently regenerating a battery when the driving route is previously defined and of decreasing exhaust gases. A controller calculates a battery stored residual charge from the output of a battery current voltage detection sensor, sets a target value for the battery residual charge in accordance with road information and information of the present location of the vehicle, received from a navigation processor, and adjusts the outputs of a motor and an engine to cause the actual battery residual charge to approach the target value.

8 Claims, 6 Drawing Sheets

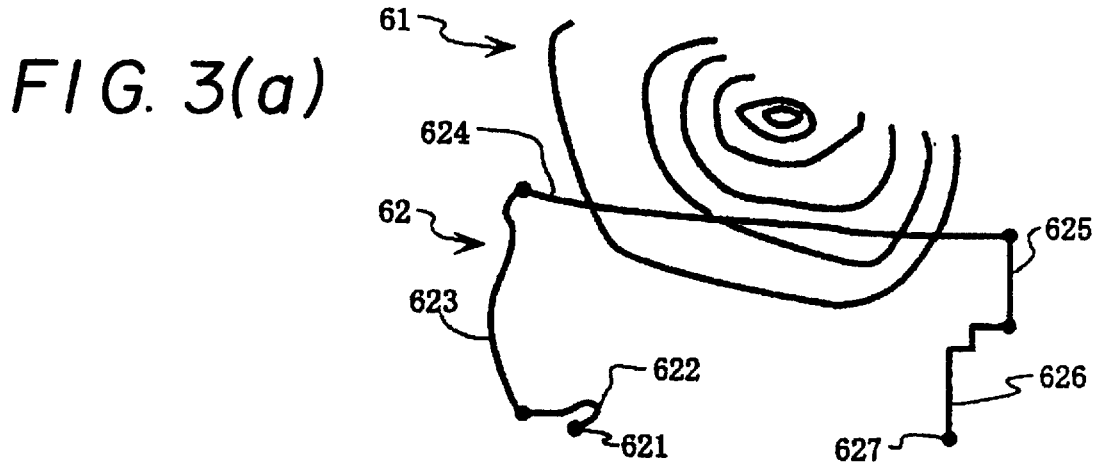
FIG. 3(a)
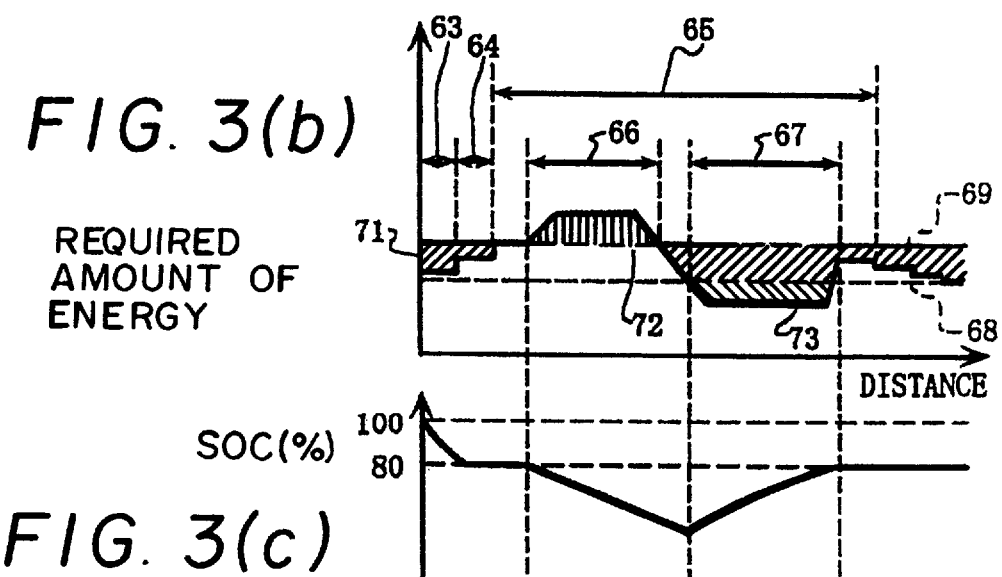
FIG. 3(b)
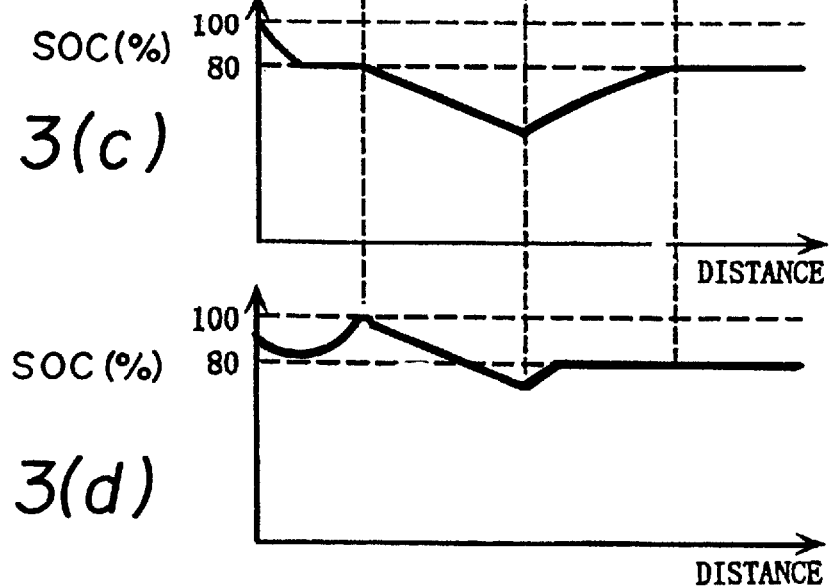
FIG. 3(c)
FIG. 3(d)

HYBRID VEHICLE INCLUDING MEANS FOR MAINTAINING RESIDUAL CHARGE CAPACITY BASED ON DESTINATION INFORMATION

This application is a division of application Ser. No. 08/546,956, filed Oct. 23, 1995, pending.

BACKGROUND OF THE INVENTION

1. Field of the Invention

This invention relates to a hybrid vehicle driven by a motor and an engine as power sources and, more particularly, to a hybrid vehicle capable of controlling the charge of a battery with reference to a driving route.

2. Description of the Related Art

Conventionally, as disclosed by, for example, Japanese Patent Application Laid-open No. Sho 56-132102, a hybrid vehicle is driven by a conventional engine capable of being easily fed with fuel and by a motor which provides clean energy. The hybrid vehicle is controlled to allot work between the engine and the motor by detecting a vehicle driving condition, such as the degree that the accelerator is opened and the vehicle speed.

However, the allotment of the work between the engine and the motor in the hybrid vehicle has been principally controlled based on only one vehicle driving condition, regardless of other considerations surrounding the vehicle.

A hybrid vehicle, in which the driving of the engine and the motor are controlled, based on detection of the present location of the vehicle and a specific shift table correlated with the location, is disclosed by Japanese Application Laid-open No. Sho 63-232027. The hybrid vehicle selects a shift table for the area by judging whether the detected present location is within the previously defined area and controls the driving of the engine and the motor based on the selected shift table in order to change the use of both the engine and the motor in accordance with the area. More specifically, outside the previously defined area, the vehicle is driven as a general vehicle is driven, and while inside the previously defined area, the vehicle is driven to facilitate driving in accordance with the surroundings by driving with the objective of decreased engine usage, so as to decrease exhaust gases.

However, in the aforementioned vehicle, there are disadvantages whereby exhaust is increased because the engine is driven relatively frequently producing a load change even where, for example, driving a long downhill slope on a mountain road.

When driving on a long downhill slope since, generally, an engine brake and a foot brake are frequently used, the battery is fully regenerated so as to receive a surplus charge and to frequently discharge surplus energy to the exterior by means of a discharge resistor; however, there are disadvantages, such as a shorter life of the battery and wasted energy.

Furthermore, considering a case in which, for example, the vehicle is controlled to maintain a predetermined value of the battery residual charge of 80% or the like and is driven on an uphill slope, the battery residual charge is greatly decreased (e.g., decreased by 50%) when the vehicle reaches the top of the uphill slope. When the battery is repeatedly charged from the aforementioned reduced level of residual charge, disadvantages, such as shortened life of the battery, result.

SUMMARY OF THE INVENTION

The present invention is intended to overcome the aforementioned disadvantages and, therefore, it is an object of the present invention to provide a hybrid vehicle with efficient recharging of the battery while travelling a predetermined driving route, and with decreased exhaust gases and improved fuel efficiency.

To attain the above objects, the present invention provides a hybrid vehicle including: a motor; an internal-combustion engine; a storage means for transferring electric power by supplying electric power to drive the motor and by receiving electric power regenerated by the motor; storage residual charge detection means for detecting the residual charge of the storage means; present location detection means for detecting the present location of the vehicle; memory means for memorizing road information; target value setting means for setting, as a target value for the storage means, a value obtained for a previously defined point based on the road information stored in the memory means and information as to the present location detected by the present location detection means; and output adjustment means for adjusting outputs of the motor and the engine to bring the charge of the storage means to the target value.

The memory means preferably has information stored therein as to the altitude, so that the target value setting means sets the target value based on the altitude of the previously defined point on the driving route ahead of the present point. The memory means also contains information as to a decelerating point for the vehicle, so that the target value setting means sets the target value based on information for the decelerating point as a previously defined point on the driving route ahead of the present point.

The target value is set in accordance with regenerated power charged from the motor to the storage means on the route from the previously defined point based on the road information read from the memory means and the present location detected by the present location detection means.

The target value setting means calculates a target value for all road segments between junctions based on the road information memorized in the memory means. And, further, the target value setting means sets the target value in view of the width of the road and the speed limit on the road from the road information memorized in the memory means.

The present location detection means has a GPS receiving device for locating the position of the vehicle by signals from artificial satellites.

The present invention may additionally include: a destination input means for inputting a destination; a route search means for determining a route from the present location detected by the present location detection means to the destination; an energy calculation means for calculating the amount of energy to be used by the vehicle in travelling the route determined by the route search means; a required energy calculation means for calculating the required energy storage for the route determined by the route search means; a target value setting means for setting a target value for the storage means in the amount calculated by the energy calculation means and the required energy storage calculated by the required energy storage calculation means; and an output adjustment means for adjusting the outputs of the motor and the engine to bring the stored charge of the storage means detected by the storage residual charge detection means to the target value set by the target value setting means.

The destination input means has a display indicating the route determined by the route search means.

That is, in the hybrid vehicle according to the present invention, the storage means supplies electric power to drive the motor and receives power regenerated from the motor, while the storage residual charge detection means detects the residual charge of the battery.

The present location detection means detects the present location of the vehicle by use of a GPS receiver which receives signals from artificial satellites to determine the position of the vehicle.

The memory means stores the road information.

The target value setting means sets the target value for the battery residual charge as the value obtained for a previously defined position by correlating the road information stored in the memory means with the present location detected by the present location detection means. The target value setting means sets the target value by using the altitude information stored in the memory means for a position ahead which is previously defined on the driving route, and by using the decelerating point information stored in the memory means determines forthcoming points previously defined on the driving route where the vehicle should be decelerated. The target value setting means set the target value based on the road information, such as the width of the road and the speed limit for the road, and calculates the target value of every road segment between junctions, based on the road information. The target value is set by calculating regenerated power which will be transferred from the motor to the storage means on the forthcoming driving route, from the previously defined position forward, by using the present location and the road information from the present location to the destination.

To bring the actual battery storage residual charge to the target value of battery storage charge the outputs of the motor and the engine are adjusted by the output adjustment means.

The route search means searches the stored road information to determine a driving route from the present location to the inputted destination. The energy calculation means calculates the energy which the vehicle will use to drive the determined driving route, the required storage charge calculation means calculates the storage charge required for travel of the determined driving route, and the target value setting means sets the target value for the storage means by using the calculated result obtained by the energy calculation means and the result obtained by the required storage charge calculation means.

The output adjustment means adjusts the outputs of the motor and the engine to bring the actual battery storage residual charge to the target value set by the target value setting means.

According to the hybrid vehicle of the present invention, the outputs of the motor and the engine are adjusted to bring the battery storage residual charge to the target battery residual value which is set based on the road information and the detected present location and, therefore, when the driving route is a previously travelled route found in memory, the regeneration charging of the battery can be efficiently facilitated.

Furthermore, from the fact that load changes of the engine can be decreased, it is known that the wasted engine usage can be decreased, exhaust gases can be decreased, and, also, the fuel efficiency can be improved.

BRIEF DESCRIPTION OF THE DRAWINGS

FIG. 3(a) is a diagram illustrating change in elevation along a predetermined route;

FIG. 3(b) to FIG. 3(d) are graphs illustrating control of the charge state of the battery when the destination is defined for the hybrid vehicle according to the present invention;

DETAILED DESCRIPTION OF THE PREFERRED EMBODIMENT(S)

The preferred embodiments of a hybrid vehicle according to the present invention will now be explained in detail with reference to FIG. 1 to FIG. 6(d).

Figure 1:
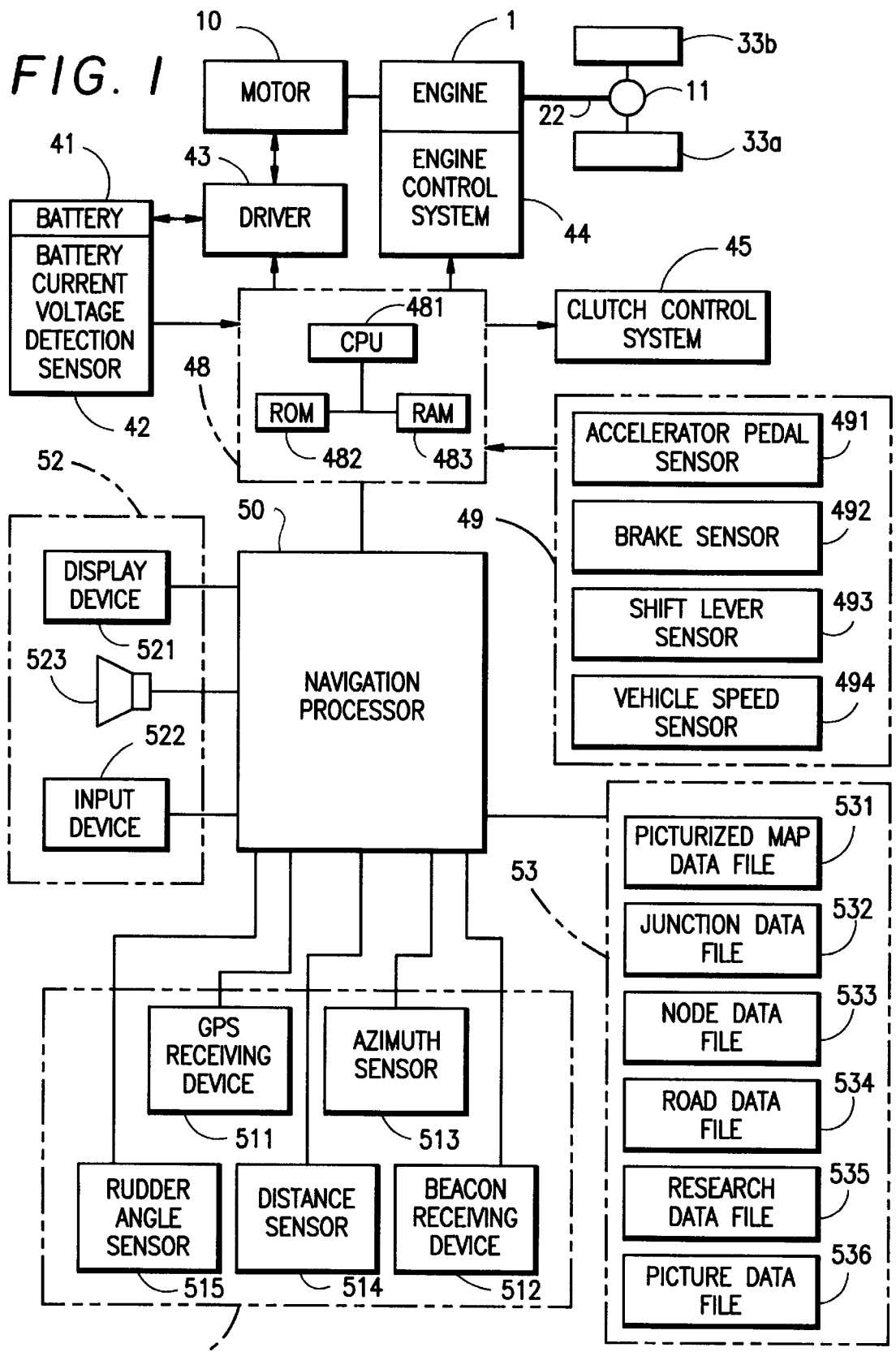
FIG. 1 is a block diagram of a navigation system for a hybrid vehicle according to a preferred embodiment of the present invention.

As shown in the block diagram of FIG. 1, the hybrid vehicle of the present invention includes an engine 1 and a motor 10, both of which generate driving force. At least one of the engine 1 output and the motor 10 output is transmitted to an output shaft 22 by means of engagement of a clutch (not-shown), and then is transferred through a differential device 11 to the front right and left wheels 33a, 33b.

In the embodiment of FIG. 1, various types of engines, such as gasoline or diesel, may be used as the engine 1, and various types of motors, such as a brushless DC motor, an induction motor or DC shunt motor may be used as the motor 10.

The hybrid vehicle includes a battery 41 for supplying electric power to drive the motor 10, a battery current/voltage detection sensor 42 for detecting electric current and voltage of the battery 41, and a driver 43 for changing electric current supplied from the battery 41 into an electric value to produce a predetermined torque by the motor 10 and for controlling regeneration current flow from the motor 10 to the battery 41.

The aforementioned battery 41 is, for example, a rechargeable battery, such as a lead-acid battery, a nickel-cadmium battery, a natrium sulphur battery, a lithium rechargeable battery, a hydrogen rechargeable battery or a redox type battery, or a mass storage condenser. The battery 41 is, for example, a source of DC electricity at 240 (V).

Furthermore, the hybrid vehicle includes an engine control system 44, for controlling the output of the engine 1 by adjusting the degree of throttle valve opening in response to the output torque value required by a driver, and a clutch control system 45 for controlling the clutch (not-shown) and the release and connection of the clutch in order to selectively output the driving force of the engine 1 and the motor 10 to the output shaft 22.

The hybrid vehicle includes a controller 48 controlling the overall operation of the vehicle, a sensor unit 49 connected to the controller 48, a navigation processor 50 also connected to the controller 48, an absolute location detector 51 for detecting the absolute location of the vehicle, an input and output unit 52 for inputting and outputting data, and various data files 53.

A navigation system is formed composed by connecting the aforementioned absolute location detector 51, input and output unit 52 and data files 53 to the navigation processor 50.

The sensor unit 49 includes an accelerator pedal sensor 491 for detecting the degree the accelerator is opened, a brake sensor 492 for detecting the degree the brake is operated, a shift lever sensor 493 for detecting the position of the shift lever, and a vehicle speed sensor 494 for detecting the vehicle speed from the rotational frequency of the output shaft 22. The signals detected by the aforementioned sensors are supplied to the controller 48.

The controller 48 has a CPU 481, which is connected through a bus line, of a data bus or the like, to a ROM (Read Only Memory) 482 for storing various programs in order to control the whole vehicle and to a RAM (Random Access Memory) 483 used as a working memory for storing various data.

The controller 48 judges the driving condition based on various detection signals supplied from each sensor in order to define the driving condition of the hybrid vehicle.

Moreover, the controller 48 calculates a residual charge of the battery 41 (hereinafter "a battery residual charge") from an electric current value and voltage value of the battery 41 which are detected by the battery current/voltage detection sensor 42, and sets a target value for the battery residual charge based on traffic information and the detected present location, which are supplied from the navigation processor 50, in order to adjust the outputs of the motor 10 and engine 1 to bring the battery residual charge, calculated based on the output of the battery current/voltage detection sensor 42, to the target value for the battery residual charge.

The absolute location detector 51 uses a GPS (Global Positioning System) receiving device 511 for determining the position of the vehicle by signals from an artificial satellite, a beacon receiving device 512 for receiving locating information transmitted by beacons placed on the streets, an azimuth sensor 513, a distance sensor 514, a rudder angle sensor 515 and so on. Incidentally, the GPS receiving device 511 and the beacon receiving device 512 alone are each capable of determining position, while the signals from the other sensors must be combined to detect the absolute location, for example, the distance sensor 514 and the azimuth sensor 513 or the distance sensor 514 and the rudder angle sensor 515.

The azimuth sensor 513 is, for example, a geomagnetism sensor which finds the direction of the vehicle by detecting geomagnetism, a gyro, such as gasrategyro or optical fiber gyro, which finds the direction of the vehicle by means of integration of an angular velocity which is found by detecting the roll acceleration of the vehicle, and a wheel sensor which calculates an amount of displacement of the azimuth by detecting the turn of the vehicle from the difference of the output pulse (the difference between the distances moved) sent from the wheel sensors respectively placed on the right and left wheels.

The distance sensor 514 employs a measurement means, for example, in which the rotational frequency of the wheels is detected and calculated or, alternatively, the acceleration is detected and calculated at twice the integral position. The rudder angle sensor 515 employs, for example, an optical rotation sensor mounted to detect rotation of a point on the steering wheel or a rotational resistance volume, or even an angle sensor attached to the wheels.

The input and output unit 52 has a display device 521, an input device 522 and an audio output device 523.

When the vehicle starts driving, the present location (a departure point) and a destination (an arrival point) are input from the input device 522, using, for example, a joystick, a key, a touch-panel, a mouse, or the input device structured to input from the screen, combined with the screen of the display device 521 to display a key or menu thereon.

The display device 521 indicates the route determined by the navigation system based on the request of the user or a guide to drive along a predetermined route. Or the display device 521 is adapted to display a distinctive picture showing a section of the route depicting scenery and a junction, distance to a junction, the turning direction at the next junction, and other information.

The display device 521 uses, for example, CRT, a liquid crystal display, a plasma display, or a hologram device projecting a hologram on a front-glass portion of the screen.

The audio output device 523 suitably outputs voice information produced by the navigation system. For instance, at a 300 m distance from a junction which is one of the guide points or directly before the junction, guide information, such as "turn to the right/left at a junction 300 m ahead", "go straight through the next junction", is output. The voice information uses audio previously recorded in CD-ROM and so on or a synthesized voice produced by a voice synthesizer.

The navigation processor 50 has a CPU (not-shown), a ROM for storing various programs such as a navigation program, and a RAM as a working memory. The navigation processor 50 receives the defined destination from the input device 522, reads various data memorized in the data file 53 along the navigation program stored in ROM, processes the read data, stores the processed data in RAM, and supplies the necessary information for driving to the input and output unit 52 and, further, information as to the present location and traffic information as road-network data for the area surrounding the present location.

The data files 53 include a picturized map data file 531, a junction data file 532, a node data file 533, a road data file 534, a research data file 535 and a picture data file 536. These data files can be encoded on various memory devices, such as a floppy disk, a hard disk, CD-ROM, a light disk, a magnetic disk, an IC card and a light card.

In the picturized map data file 531, data for maps to be pictured on the display device 521 are stored. The data for the picturized maps are stored in the picturized map data file 531 as respective hierarchy maps, for example, from the top hierarchy down: Japan, the Kanto district, Tokyo and Kanda. The display device 521 displays a map based on the picturized map data which includes, for example, node lines of the coast-line, node lines of the state border, node lines of the national highways, node lines of expressways, the national highway road numbers and the names of cities.

The picture data file 536 stores pictures showing each junction, distinctive scenery along the defined route and so on, in the order of the numbered pictures. The data for the pictures is stored as digital data, analogue data to be applied to the display device 521 or are stored in the form of negatives.

The data used for searching the route includes the road-network data composed of the data for junctions, data for node and data for roads which are respectively stored in the junction data file 532, the node data file 533 and the road data file 534.

The junction data file 532 stores data for junctions having, under each junction number, the name of the junction, latitude and longitudinal coordinates of the junction, the smallest road number of the roads starting at the junction, the smallest road number of the roads ending at the junction, and indication of the presence of a traffic signal.

The road data file 534 stores data for roads including, under each road number, for example, the Junction number as the starting point on the road, the junction number as the ending point on the road, the name of the road having the second number of the roads starting from the same starting point, the name of the road having the second number of the roads ending at the same ending point, width of the road, prohibitions on use of the road, unnecessary guidance information, the initial address of the node line data, the node number, the picture number of the picture data which will be discussed below, and the length of the road.

The node data file 533 stores the node data which is based on information, for example, a tunnel and a pedestrian crossing capable of detection with a sensor or the like, as distinguishable points on the route. The node data is data for one point on the road, in which nodes are connected to one another by an arc, with the result that the road is illustrated by connecting each arc among plural node lines. The node data includes other data, such as East–West direction, North–South direction, altitude, and attribute.

The research data file 535 stores the junction line data and the node line data which are produced by researching the route. The junction line data is based on information of the name of the junction, the junction number, the picture number of the picture showing the distinguishable scenery around the junction, the angle the vehicle is to turn, and distance, and the node line data is based on information of the East–West direction, the North–South direction and the altitude for indicating the node position and information of the junction number, attribute, angle, distance and so on. Incidentally, all the aforementioned data is for the Junctions exclusive of the unnecessary guidance information. The navigation processor 50 researches the route by using the Junction data, the road data and the node data based on the present location and the destination which are inputted by the input device 522, and indicates to the driver which is the best route to drive until the absolute location detector 51 can ascertain the present location at any given time.

Next, control of charging of the battery 41 in accordance with the defined destination will be explained with reference to the flow chart in FIG. 2.

Figure 2:
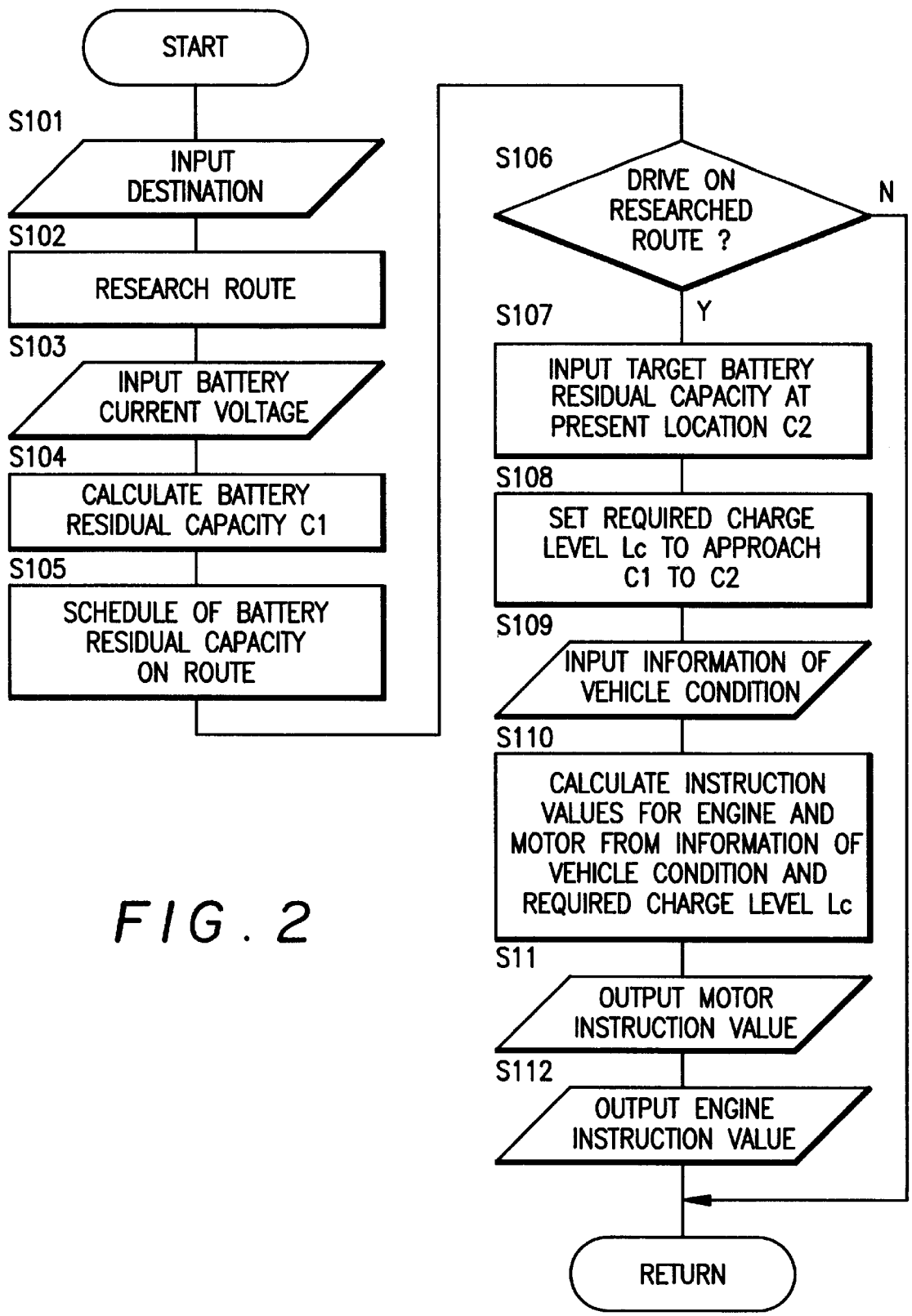
FIG. 2 is a flow chart of a routine for controlling the charge state of a battery when a destination is defined, which routine is executed by the apparatus of FIG. 1.
Figure 4A:
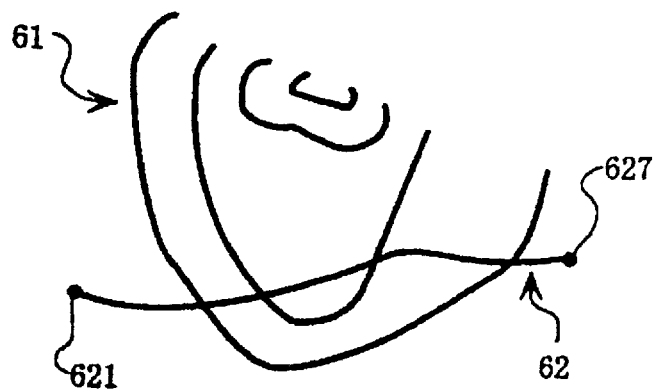
FIG. 4(a) is a diagram illustrating change in elevation along a predetermined route.
Figure 4B:
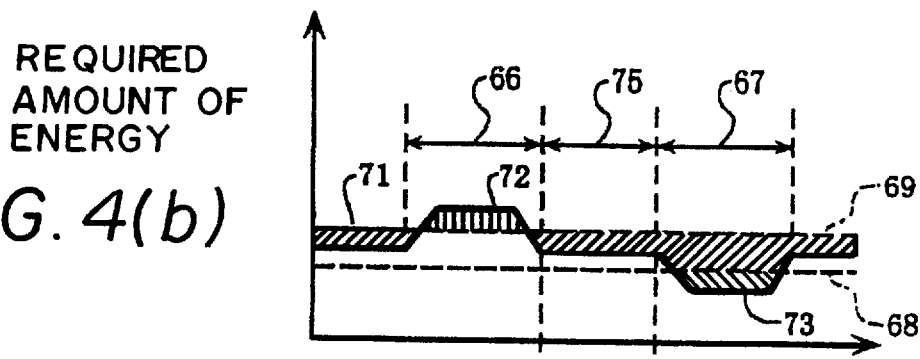
FIG. 4(b) to 4(d) are graphs illustrating control of the charge state of the battery when the destination is defined for the hybrid vehicle according to the present invention.
Figure 4C:
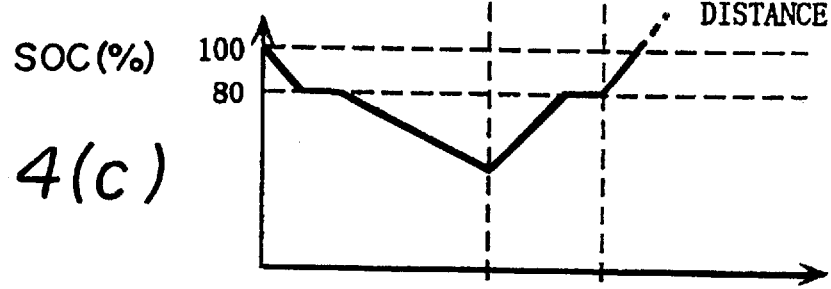
Figure 4D:
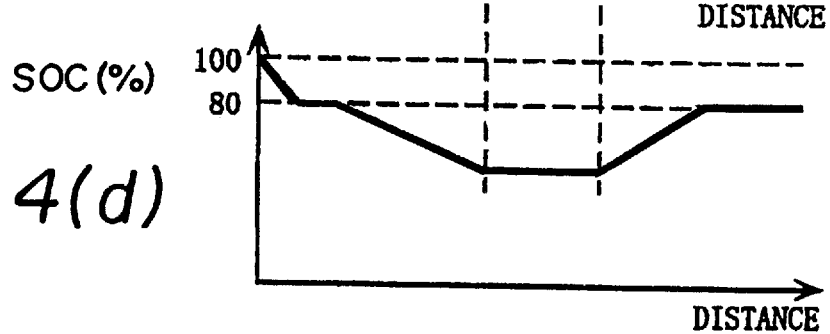

In the routine of FIG. 2, the navigation processor 50 inputs the destination (Step 101), and researches the route (Step 101). The controller 48 inputs the electric current value and voltage value of the battery from the battery current voltage detection sensor 42 (Step 103), and computes the battery residual charge C1 from the electric current value and the voltage value (Step 104). The controller 48 makes a schedule for a target value of the battery residual charge on the driving route based on the traffic information and the information of the present location which are supplied from the navigation processor 50 (Step 105). The schedule is based on the necessary driving output estimated from the information as to the type of road, width of the road, the altitude, the speed limit for each road section between the junctions, and represents a decision as to the amount of the battery residual charge needed for driving on the route until the destination is reached.

The controller 48 judges whether the vehicle is driven on the researched route or not (Step 106), and if the vehicle is not driven on the researched route (No), the routine shown in FIG. 2 is finished. If the vehicle is driven on the researched route (Step 106; Yes), the controller 48 inputs the target battery residual charge C2 at the present location (Step 107), and settles the required charge level Lc to bring the actual battery residual charge C1 to the target battery residual charge C2 (Step 108).

The controller 48 inputs the information of the vehicle condition, such as the degree the accelerator is opened and the degree the brake is operated, from the sensor unit 49 (Step 109), computes an instruction value for the motor and an instruction value for the engine in order to adjust the outputs of the motor 10 and the engine 1 by using the information of the vehicle condition and the required charge level Lc (Step 110), outputs the instruction value for the motor to the driver 43 (Step 111), and outputs the instruction value for the engine to the engine control system 44 (Step 112), and then the routine shown in FIG. 2 is finished. Incidentally, during the driving of the route, the actual battery residual charge is controlled to approach C1 the target battery residual charge C2 by repetition of the routine shown in FIG. 2 as each occasion demands.

FIGS. 3(a)–3(d) serve to explain the control of the charge state of the battery 41 when the destination is defined with reference to FIG. 3.

FIG. 3(a) shows contour lines 61 and a driving route 62 set by researching of the navigation system. The contour lines 61 show the higher altitude as near the center line. In the driving route 62, numeral 621 is the present location, numeral 627 is the destination, numerals 622 and 626 are regular roads, numerals 623 and 625 are highways, and numeral 624 is an expressway.

FIG. 3(b) shows the relationship between the distance and the amount of energy required when the vehicle is driven along the driving route 62 shown in FIG. 3(a). In the drawing, numeral 63 indicates an area in which the vehicle is driven on a regular road 622, numeral 64 indicates an area in which the vehicle is driven on a highway or the like 623, numeral 65 indicates an area in which the vehicle is driven on an expressway 624, numeral 66 indicates an area in which the vehicle is driven on an uphill slope, and numeral 67 indicates an area in which the vehicle is driven on a downhill slope. Further, numeral 68 is a line where the amount of the required energy is zero, thus, zero energy is required below the level of line 68. Numeral 69 indicates a line for the maximum output level of the engine 1. An area 71 below the maximum output level 69 of the engine 1 is an area where the engine is capable of maximum output, in other words, the area is capable of being driven by the engine 1 during charging. On the other hand, an area 72 above the maximum output level 69 of the engine 1 is an area where the motor is driven by power from the battery 41, and area 73 below the zero level 68 of required energy is an area where the battery should be regenerated.

FIG. 3(c) shows the relationship between amount of the battery residual charge and the distance when the vehicle is driven on route 62 shown in FIG. 3(a), under control to maintain a battery residual charge (SOC) of 80% at all times in the conventional hybrid vehicle. The battery residual charge is maintained at 80% at all times because the battery needs capacity of a certain range in order to always be capable of receiving regeneration current, and if the battery residual charge is almost 100%, the charging efficiency is decreased. As is seen from the drawing, in the conventional control the battery residual charge is much decreased (e.g., by 50%) after the vehicle has been driven to the top of the uphill slope 66. Repeatedly charging the battery 41 with such a decreased battery residual charge, shortens the life of the battery. Further, when the charge of the battery 41 is low, the vehicle speed is decreased due to insufficient electric power to the point where the vehicle can not be driven.

FIG. 3(d) shows the relationship between the distance and the battery residual charge when the hybrid vehicle is driven on the route 62 shown in FIG. 3(a). In view of the known uphill slope 66 and the downhill slope 67 on the route ahead, before driving the uphill slope 66, the schedule setting the target value for the battery residual charge is made in order to charge the battery 41 until the battery residual charge becomes almost 100%, and then the outputs of the motor 10 and the engine 1 are adjusted to bring the actual battery residual charge C1 to the target battery residual charge C2.

Therefore, as shown in FIG. 3(*d*), before driving the uphill slope 66, the battery is charged until the battery residual charge is almost 100%, so that the decrease of the battery residual charge can be controlled after reaching the top of the uphill slope 66. As a result, the battery need not be immediately charged after the vehicle is driven to the top of the uphill slope 66, so that the life of the battery can be extended longer with the battery repeatedly discharging within a range for battery residual charge of 70% and 100%, as contrasted with repeated discharges between, for example, battery residual charges of 50% and 100% as in the conventional control.

FIG. 4(*a*) shows the contour lines 61 and the driving route 62 set by research of the navigation system. Incidentally, in this embodiment, the driving route 62 is a highway whereon there is some distance between the uphill slope and the downhill slope.

FIG. 4(*b*) shows the relationship between the distance travelled and amount of required energy when the vehicle is driven on route 62 shown in FIG. 4(*a*). In this instance, the vehicle is driven, for a short time, on the uphill slope portion 66 where a high energy level is not needed, on an area 75 where not much energy is needed, and then on the downhill slope portion 67.

FIG. 4(*c*) shows, with control to maintain the battery residual charge (SOC) at 80% at all times in the conventional hybrid vehicle, the relationship between amount of the battery residual charge and the distance when the vehicle is driven on the driving route 62 shown in FIG. 4(*a*). As is seen from the drawing, the conventional control is adapted to regenerate to maintain the battery residual charge at 80% in order to immediately recover the energy which has been consumed by driving the uphill slope 66 when the vehicle has reached the top of the uphill slope 66.

However, it is not known when the vehicle reaches the top of the uphill slope whether there is a downhill slope 67 and, because the system is adapted to charge the battery again while the vehicle is driven on the downhill slope 67, is not accounted for, the result will be that energy is wasted by discharging the surplus energy as heat with, for example, a discharge resistor.

FIG. 4(*d*) shows the relationship between the distance and the battery residual charge when the vehicle is driven on route 62 shown in FIG. 4(*a*) in the hybrid vehicle of the embodiment. Because it is previously known that there is a downhill slope 67 for a short distance after the uphill slope 66, so that the charging is not conducted in traversing the area 75 where little energy is needed, and the schedule is made to set the target value of the battery residual charge taking into account that the battery will be charged while the vehicle is driven on the downhill slope 67, and the outputs of the motor 10 and the engine 1 are adjusted to cause the actual battery residual charge C1 to approach the target battery residual charge C2.

Therefore, the life of the battery can be extended by preventing over-charging of the battery, and further, wasteful driving of the engine is decreased, so that exhaust gases are decreased.

Figure 5:
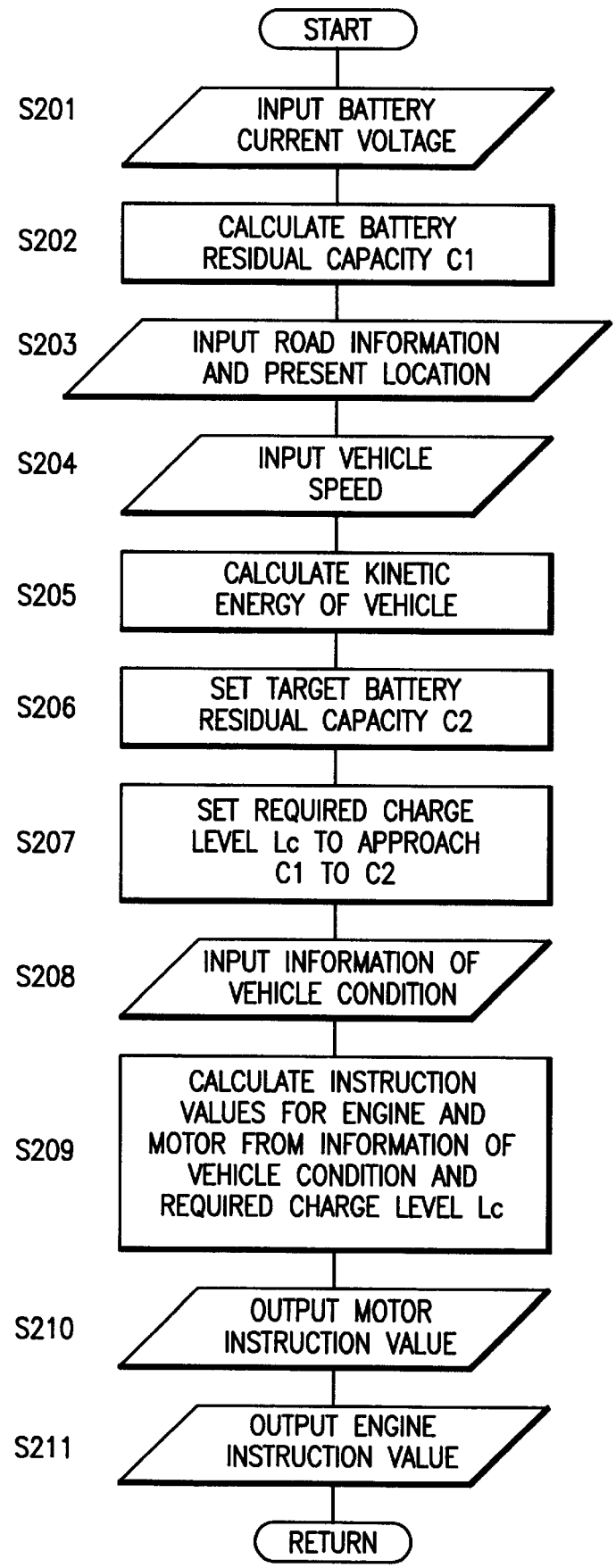
FIG. 5 is a flow chart of a routine for controlling the charge state of the battery when the destination is not defined for the hybrid vehicle according to the present invention.

The following will explain the controlling of charging of the battery 41 when the destination is not defined, with reference to the flow chart of FIG. 5.

In execution of the routine of FIG. 5, the controller 48 inputs the electric current value and the voltage value of the battery 41 from the battery current voltage detection sensor 42 (Step 201) and calculates the battery residual charge C1 from the inputted electric current value and voltage value (Step 202). The controller 48 inputs the information as to the present location and the road information supplied from the navigation processor 50 (Step 203).

Incidentally, the navigation processor 50 supplies the information as to the present location and the road information in response to the request from the controller 48 even when route guidance is not provided. The road information includes information as to a point in which the vehicle should be decelerated, such as a tollgate of an expressway or junction on a general road.

The controller 48 inputs the information of the vehicle speed from the vehicle speed sensor 494 (Step 204), computes kinetic energy of the vehicle from the vehicle speed (Step 205) and sets the target battery residual charge C2 based on the road information, the information as for the present location, the kinetic energy of the vehicle and the present battery residual charge C1 (Step 206).

Next, the controller 48 sets a required charge level Lc to approach the actual battery residual charge C1 to the target battery residual charge C2 (Step 207). The information as to vehicle operating conditions, such as the degree of accelerator opening and the degree the brake is depressed, is inputted from the sensor unit 49 (Step 208). The instruction values for the motor and the engine are computed from the information for the vehicle operating conditions and the required charge level Lc in order to adjust the outputs of the motor and the engine (Step 209). The instruction value for the motor is output to the driver 43 (Step 210), the instruction value for the engine is output to the engine control system 44 (Step 211), and then the routine shown in FIG. 5 is finished.

The following explains an example of the control of the charge state of the battery 41 when the destination is not defined, with reference to FIG. 6(*a*) to FIG. 6(*d*). In this example, the control of battery charge assumes that the relationship between the distance and the vehicle speed is as shown in FIG. 6(*a*). In the drawing, a deceleration point 80 where the vehicle speed is low is regarded as the tollgate on a expressway, junction on a general road or the like. The aforementioned relationship between the distance and the vehicle speed can be supposed by using the information of the present location and the road information supplied from the navigation processor 50.

FIG. 6(*b*) shows the relationship between the distance and the amount of the required energy when the vehicle is driven at the vehicle speed indicated in FIG. 6(*a*).

FIG. 6(*c*) shows the relationship between the distance and the battery residual charge when the vehicle is driven at the vehicle speed indicated in FIG. 6(*a*), in the case of controlling the battery to maintain the battery residual charge (SOC) at 80% at all times in the conventional hybrid vehicle. As is seen from the drawing, in the conventional control, a constant speed distance 82 in FIG. 6(*a*)–FIG. 6(*d*) provides regeneration to maintain the battery residual charge at 80% in order to immediately recover the energy used up by acceleration 81 in FIG. 6(*a*)–FIG. 6(*d*).

However, the prior art ignores the period of deceleration 83 from the aforementioned point forth, so that the battery with a battery residual charge which is already at a high level is further charged in deceleration through distance 83, with the result of inferior charge efficiency, regardless of a surplus charge or a non-surplus charge.

Figure 6A:
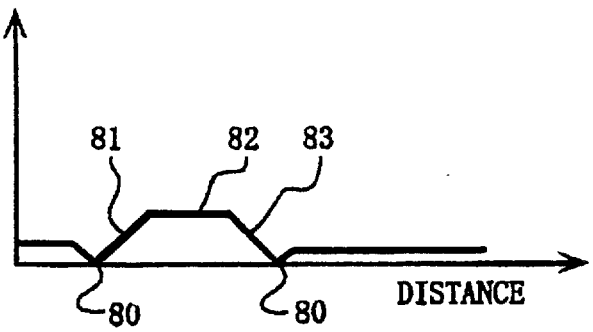
FIG. 6(a) to FIG. 6(d) are graphs illustrating control of the charge state of the battery when the destination is not defined for the hybrid vehicle according the present invention.
Figure 6B:
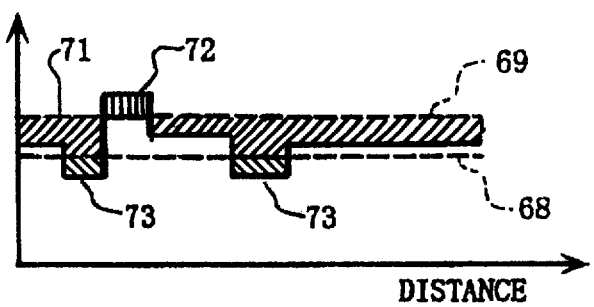
Figure 6C:
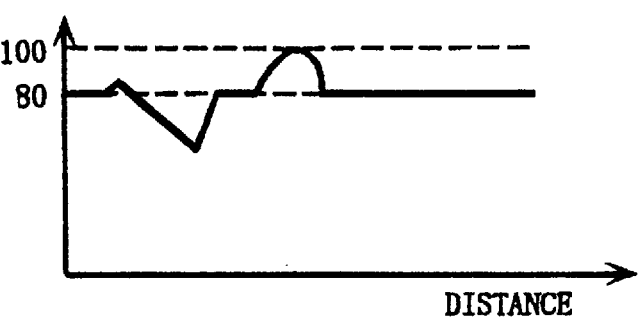
Figure 6D:
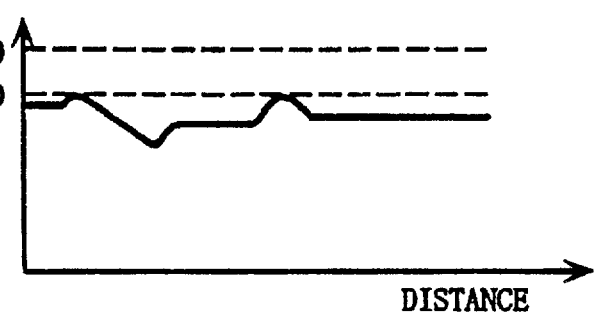

FIG. 6(d) shows the relationship of the distance and the battery residual charge when the vehicle is driven at the vehicle speed indicated in FIG. 6(a). In the present embodiment, the deceleration through distance 83, from the constant speed at 82, is taken into account by setting the target battery residual charge C2 at a lower level than the design battery residual charge (e.g., 80%), and then the outputs of the motor 10 and the engine 1 are adjusted to cause the actual battery residual charge to approach the target battery residual charge C2.

That is, there is capacity available for the energy regenerated by sudden deceleration. Therefore, the travel will decelerate though distance 83 can be better utilized for regeneration.

Incidentally, the present invention is not intended to be limited to the aforementioned embodiments. For example, the means for determining the battery residual charge is not limited to a calculation based on the electric current and the voltage of the battery 41, but also may be calculated from the specific gravity of the electrolyte in battery 41.

Furthermore, the present invention can be applied to all types of hybrid vehicles, inclusive of the parallel type and the series type.

In the embodiments as described above the target value of the battery residual charge is set by using the information of the present location, the information of the deceleration point, and information of the altitude, but the present invention is not intended to be so limited. For example, it is possible to calculate the energy available for regeneration from the driving conditions on the driving route, from the present location of the vehicle to a given point, which can be assumed from the width of the road, the speed-limit on the road or the like. Therefore, the target value of the battery residual charge on the driving route from the present location of the vehicle to a given point may be set by using the road information, such as the width of the road and the speed limit on the road.

Moreover, the embodiments of the present invention have been explained in terms of a target value for battery residual charge of 80%; however, the present invention is not intended to be limited to that value; more specifically, it is possible for the target value to be, for example, 82%, 85%, 90%, 95%, 78%, 75%, and 70%. One of aforementioned values is properly selected in accordance with the type of the battery or the like, and the target value may be changed for the same battery with progress of time.

What is claimed is:

1. A hybrid vehicle, comprising:

a motor;

an internal-combustion engine;

storage means for transferring electric power with the motor;

storage residual capacity detection means for detecting residual charge capacity of the storage means;

present location detection means for detecting a present location of the vehicle;

memory means for memorizing road information;

destination input means for inputting a destination;

route research means for researching the memorized road information to determine a route from the present location detected by the present location detection means to the destination;

energy calculation means for calculating an amount of energy to be used by the vehicle on the route determined by the route research means;

required storage capacity calculation means calculating storage capacity required for the route determined by the route research means;

target value setting means for setting a target value for the storage means in response to the amount of energy calculated by the energy calculation means and the required storage capacity calculated by the required storage capacity calculation means; and output adjustment means for adjusting outputs of the motor and of the engine to cause the residual charge capacity of the storage means detected by the storage capacity detection means to approximate the target value set by the target value setting means.

2. The hybrid vehicle according to claim 1, wherein said destination input means includes display means for displaying the route determined by said route research means.

3. The hybrid vehicle according to claim 1, wherein said memory means contains information as to altitude, and wherein said target value setting means sets the target value based on the altitude information for defined points on the route determined by the route research means.

4. The hybrid vehicle according to claim 1, wherein said memory means contains information identifying decelerating points for the vehicle, and wherein said target value setting means sets said target value based on the information for decelerating points on the route determined by the route research means.

5. The hybrid vehicle according to claim 1, wherein said target value is set in response to regenerated power to be received by said storage means from said motor on the route determined by the route research means, between the destination and the present location detected by the present location detection means.

6. The hybrid vehicle according to claim 1, wherein said target value setting means calculates a target value for each of plural road segments between junctions based on said road information memorized in said memory means.

7. The hybrid vehicle according to claim 1, wherein said target value setting means sets said target value in accordance with information as to width of the road and the speed limit, for the determined route, stored as road information memorized in said memory means.

8. The hybrid vehicle according to claim 1, wherein the present location detection means includes a GPS receiving device for receiving signals from artificial satellites.

* * * * *